Jan. 23, 1962 K. L. WESTLIN 3,017,952
ELECTROSTATIC PRECIPITATOR
Filed Feb. 3, 1960 2 Sheets-Sheet 1

INVENTOR.
KARL L. WESTLIN
BY
Ralph B. Brick
ATTORNEY

Jan. 23, 1962 K. L. WESTLIN 3,017,952
ELECTROSTATIC PRECIPITATOR
Filed Feb. 3, 1960 2 Sheets-Sheet 2

INVENTOR.
KARL L. WESTLIN
BY
ATTORNEY

United States Patent Office 3,017,952
Patented Jan. 23, 1962

3,017,952
ELECTROSTATIC PRECIPITATOR
Karl L. Westlin, Louisville, Ky., assignor to American Air Filter Company, Inc., Louisville, Ky., a corporation of Delaware
Filed Feb. 3, 1960, Ser. No. 6,543
2 Claims. (Cl. 183—7)

This invention relates to electrostatic precipitators and more particularly to an improved structural arrangement for the electrode plates of electrostatic precipitators.

In accordance with the present invention, an improved plate electrode assembly is provided which insures a proper spacing of the plates in such assembly with effective and firm electrical contact between certain select parts thereof to reduce possible problems of arc-over. These desirable features are obtained in the plate electrode assembly of the present invention without sacrificing any features of past electrode assemblies, the present invention further providing an assembly which is economical in construction and which can be assembled rapidly and efficiently with a minimum of operating steps and with few materials.

Various other features of the present invention will become obvious to one skilled in the art upon reading the disclosure set forth hereinafter.

More particularly, the present invention provides a plate electrode assembly for an electrostatic precipitator comprising a plurality of plates spaced from each other a predetermined distance, the plates having openings therein of preselected contour and spacer bar means of cross-sectional contour conforming substantially to the contour of the openings to permit passage of the spacer bar means through the openings, the spacer bar means having sets of slots extending in a direction diagonally transverse the longitudinal axis of the spacer bar means with the slots of each set being spaced from each other substantially the same distance as the plates, the slots being of sufficient depth and breadth to permit rotation of the spacer bar means about the longitudinal axis from one position to another when the spacer bar means has been passed through the openings and the slots are aligned with the plates wherein the plates engage in the slots to be maintained in spaced relation, the slots of one set extending in a diagonal direction opposite to the diagonal direction in which the corresponding slots of an adjacent set extend.

It is to be understood that various changes can be made in the arrangement, form and construction of the several parts of the assembly disclosed herein by one skilled in the art without departing from the scope or spirit of the present invention.

Referring to the drawings which disclose one advantageous embodiment of the present invention:

Figure 3:
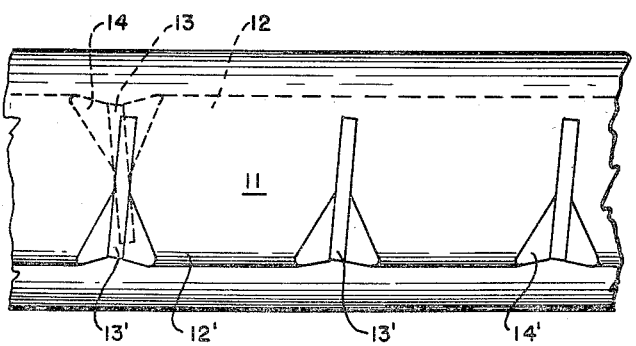
FIGURE 3 is an enlarged side view of a portion of the spacer bar of the present invention, with the fin portions at an incline to the vertical, disclosing the sets of diagonally arranged slots in the spacer bar member with corresponding points along corresponding slots of opposite fin portions resting in common planes normal to the longitudinal axis of the spacer bar.
Figure 4:
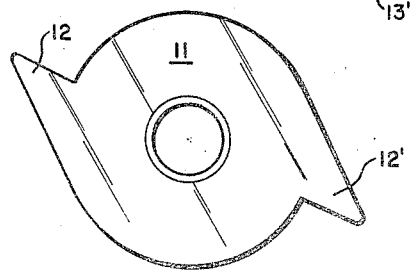
FIGURE 4 is an end elevation view of the spacer bar of FIGURE 3.
Figure 5:
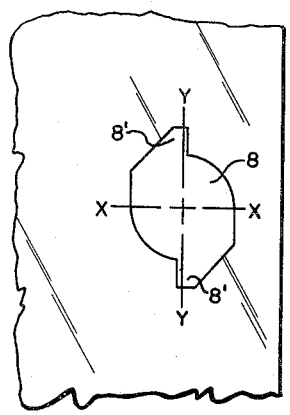
FIGURE 5 is an enlarged side elevation of a portion of one plate, disclosing an opening in the plate with which a spacer bar like that of FIGURES 3 and 4 co-operates.
Figure 6:
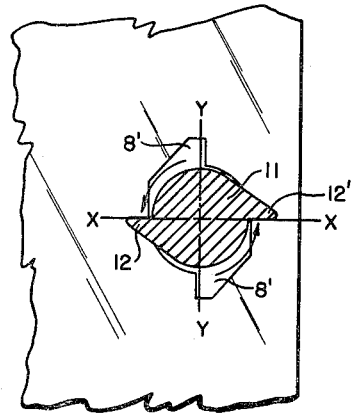
Figure 7:
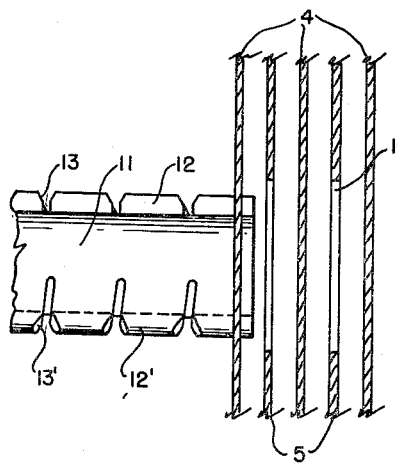
Figure 8:
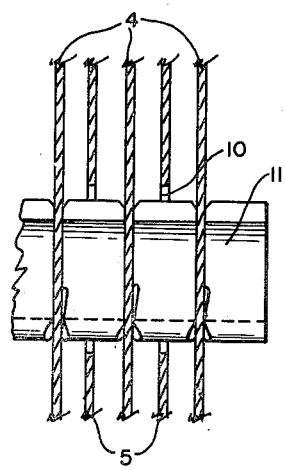
Figure 9:
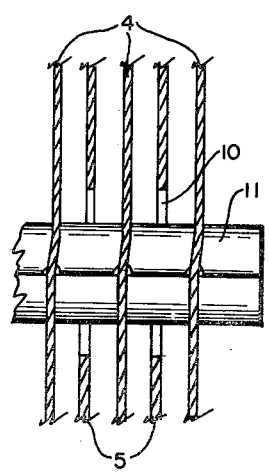

FIGURE 6 is an enlarged side elevation of a portion of a plate similar to that of FIGURE 5, further disclosing a cross section of a spacer bar after it has been inserted into the opening of the plate and rotated into operational position; and, FIGURES 7–9 are a series of enlarged, schematic, partial plan views, disclosing the steps involved in assembling the plates and spacer bars of the electrode assembly of FIGURES 1–6.

Figure 1:
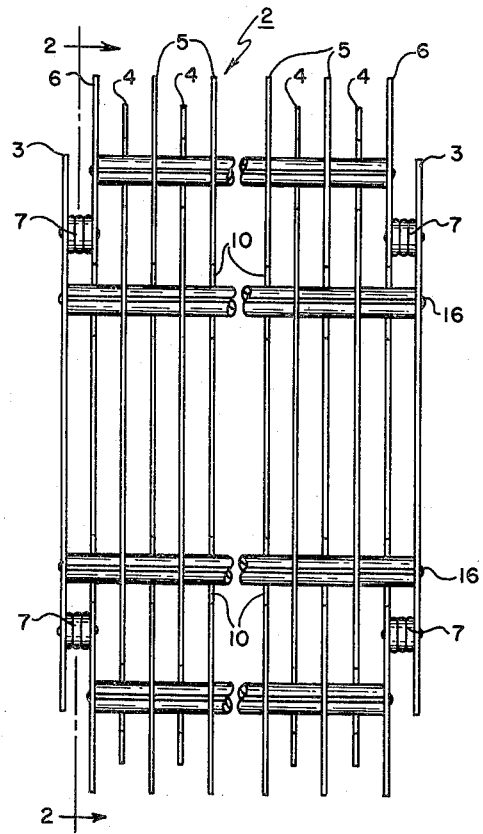
FIGURE 1 is a partial face elevation of a plate electrode assembly arrangement which incorporates the features of the present invention.
Figure 2:
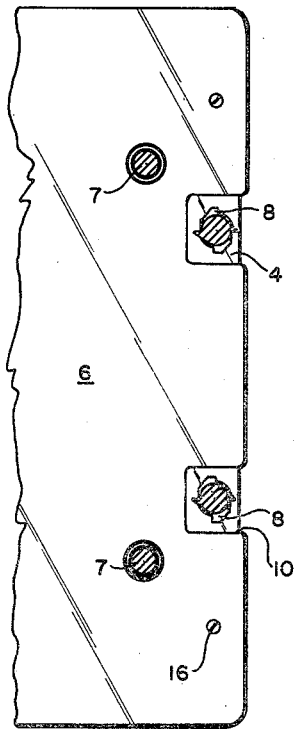
FIGURE 2 is a partial side elevation taken in a plane passing through line 2—2 of FIGURE 1.

Referring to FIGURES 1 and 2 of the drawings, plate assembly 2, which embodies the present invention, includes charged end plates 3 from which are supported, intermediate thereto, charged plates 4. Charged plates 4 are arranged in spaced parallel relationship to each other and have positioned in alternate arrangement therewith, the spaced parallel grounded electrode plates 5. Plates 5 are supported from grounded end plates 6 which, in turn, are attached to the housing in the precipitator (not shown) and which support end plates 3 by means of insulators 7.

The principal features of the present invention are incorporated in a structure utilized for supporting the intermediate electrode plate arrangements from their respective end plates. As can be seen more particularly in FIGURES 1, 2, 5 and 6, each electrode plate 4 is provided with support openings 8 therein. It is to be understood that in one advantageous embodiment of the invention, four or more such openings can be provided in each plate. The plates 4 are loaded in a jig for proper parallel spacing and for proper alignment of corresponding support openings. It is to be noted that each of the support openings in the advantageous embodiment of the invention disclosed is of a contour as indicated in FIGURES 5 and 6 with the major axis Y—Y of such opening extending in a vertical direction along the plate and the minor axis X—X extending in a horizontal direction, with portions of the opening above and below the minor axis being the mirror image of each other. It is to be understood, in this connection, that the contour and orientattion of the openings are not restricted to the embodiment disclosed and, if desired, the major and minor axes can extend in other directions relative the plates.

Once plates 4 are properly set in a jig, spacer bar members 11 are inserted through the aligned sets of openings 8. As can be seen in FIGURES 3, 4 and 7 of the drawings, spacer bars 11 are of a cross-sectional contour conforming substantially to the contour of the support openings 8, providing limited tolerance therebetween when passed through the openings after having been properly oriented in alignment with such openings. It is to be noted that openings 8 include break-away portions as at 8′ (attention being directed to FIGURES 5 and 6). The reasons for the break-away contour of the openings will be discussed hereinafter. It also is to be noted that spacer bars 11 are each provided with fin portions 12 and 12′ which extends from diametrically opposite sides of the body of the bar, the distance between the extremities of fin portions 12 and 12′ being slightly less than the distance along the major axes Y—Y of openings 8. In like manner, the distance between the sides of the spacer bar taken in a plane normal to the plane common to the fin portions 12, 12′ is slightly less than the distance along the minor axes X—X of openings 8. Sets of slots 13 and 13′ are provided in fin portions 12, 12′ respectively so as to extend transverse the longitudinal axes of spacer bar members 11 on opposite sides thereof. The slots in each set 13 and 13′ are spaced from each other a preselected distance which distance is substantially the same as the distance that plates 4 are spaced from each other in a jig during plate electrode assembly (as will be seen hereinafter). It is to be noted that slots 13 and 13′ are of sufficient depth and breadth to permit rotation of the spacer bars 11 about their longitudinal axes from one position to another when the spacer bars have been passed through plate openings 8 of plates 4 and the slots are in proper alignment with the plates. It further is to be noted that the slots of sets 13 in fins 12 extend in a diagonally transverse direction to the longitudinal axes of spacer bars 11. Equally, the slots of sets 13′ in fins 12′ also extend in a diagonally transverse direction to the longitudinal axes of spaced bars 11, only in a direction opposite and reciprocal to that direction in which slots of sets 13 of fins 12 extend, the corresponding points of corresponding slots in slot sets 13 and 13′ resting in common planes normal to the longitudinal axes of spacer bars 11 (FIGURE 4). It further is to be noted that the slots of sets 13 and 13′ are each provided with flared openings as at 14 and 14′, respectively. The flared opening 14 of each slot of set 13 is in alignment with the flared opening 14′ of the corresponding slot of set 13′, on the opposite side of the longitudinal axis of bar member 11. It is to be understood that the diagonal angle of direction in which the slots extend and the angle of flare of the openings can be varied in accordance with the results desired. In one advantageous embodiment of the invention disclosed, it has been found desirable to provide the flared openings with the determining sides thereof forming a 45° angle to a plane which passes intermediate the determining sides and normal to the longitudinal axis of the bar member. It also has been found desirable to arrange the diagonal of the slots so that a plane passing along the mean path of the slots would be at a 5° angle to the longitudinal axis of the bar member.

With the arrangement described, it is possible to hold the electrode plates of an assembly in properly spaced relation, lock the assembly into the desired position and, at the same time, establish a firm electrical contact between several parts of the assembly when the same is necessary. It is to be noted that the limited tolerances provided between spacer bars 11 and openings 8, as abovementioned, avoid accurate machine requirements and permit ready assembly of the several parts of the overall structure without requiring precise jig alignment. It also is to be noted that the break away portions 8′ of the openings 8 permit rotation of bars 11 through a slight angle about their longitudinal axes before a wedging action between the slots and the plates occurs. It is to be understood that the spacer bars can be cast, rolled, or press formed and, in some instances, can be extruded advantageously from a suitable material such as aluminum.

Referring to FIGURES 7-9 of the drawings, the several steps of assembling the plates are disclosed in detail. In assembly, plates 4 are supported in a jig (not shown) in spaced relationship to each other with the corresponding support openings 8 in alignment, the spacing between plates being the same as the spacing of the transverse slots in sets 13 and 13′ of spacer bars 11. Bars 11 are then inserted through the openings 8, the bars being oriented so that the fin portions 12 and 12′ are in alignment with the major axes Y—Y of the openings 8. When each of the sets of slots 13 and 13′ of each bar is opposite its matching plate 4, the bar is turned through a 90° angle about its longitudinal axes so that the plates engage in the sets of corresponding slots 13 and 13′. In this connection, as aforestated, it will be noted that the sets of corresponding slots 13 and 13′ are of sufficient depth and breadth to permit this action. At the same time, it is to be noted that the break-away portions 8′ in openings 8 and the flared openings 14′ and 14 to the sets of slots 13 and 13′ insure that the sets of slots in opposite fin portions of a bar engage with portions of the plate on opposite sides of the openings 8 simultaneously. Since the slots of sets 13 and 13′ of each bar extend in a diagonal but opposite and reciprocal direction to the longitudinal axis of the bar, a wedging action occurs as the bar is turned about its longitudinal axis and the slots engage with the plates on opposite sides of openings 8. This wedging action between the slots and plates serves to insure effective and firm contact between the plates and bar so as to provide proper electrical contact without arc-over when the plates are electrically charged during precipiating operations. Further, it is to be noted that since the diagonal angles that the slots form with the longitudinal axes of the spacer bars are comparatively small and that since there is a uniformity of wedging action on opposite sides of the longitudinal axes of the bars, only a minimum amount of controlled plate distortion occurs.

To fasten the assembly to end plates 3, spacer bars 11 are tapped at their extremities to receive cap screws 16 which hold the spacer bars to plates 3. With the spacer bars properly in position in the assembly, the plates in the assembly are spaced correctly and cannot be changed until spacer bars 11 are unfastened from end plates 3, turned 90°, and withdrawn from the plate openings.

It is to be noted that when inserting spacer bars 11 into openings 8 of plates 4, provision is made in the form of cutaways 10 in grounded plates 5 and 6 (FIGURES 1 and 2) to permit such assembly and provide proper electrical clearance when necessary. It further is to be noted that grounded plates 5 and 6 can be provided with spacer bar arrangements similar to that provided for charge plates 3 and 4, and that charge plates 3 and 4 can, in turn, be provided with cutaways 10 to permit proper insertion and clearance of the spacer bars for the grounded plates.

The invention claimed is:

1. A plate electrode assembly for an electrostatic precipitator comprising a plurality of plates spaced from each other a predetermined distance, said plates having openings therein of preselected contour and a spacer bar of cross-sectional contour conforming substantially to the contour of said openings to permit passage of said spacer bar through said openings, said spacer bar having sets of slots extending diagonally transverse the longitudinal axis of said spacer bar on opposite sides thereof with the slots of each set being spaced from each other substantially the same distance as said plates and including flared entrances to insure ready engagement of said slots with said plates, said slots being of sufficient depth and breadth to permit rotation of said spacer bar about its longitudinal axis from one position to another when said spacer bar has been passed through said plate openings and said slots are aligned with said plates wherein said plates engage in said slots to be maintained in spaced relation, the slots of one set extending in a diagonal direction opposite to the diagonal direction in which the corresponding slots of an adjacent set extend with corresponding points along corresponding slots in opposite sets resting in common planes normal to the longitudinal axis of the spacer bar.

2. A plate electrode assembly for an electrostatic precipitator comprising a plurality of plates spaced from each other a predetermined distance, said plates having openings therein of preselected contour and spacer bar means of cross-sectional contour conforming substantially to the contour of said openings to permit passage of said spacer bar means through said openings, said spacer bar means including spaced bar members each having sets of slots extending diagonally transverse to and on opposite sides of the longitudinal axis thereof with the slots of each set being spaced from each other substantially the same distance as said plates and including flared entrances to insure ready engagement of said slots with said plates, said slots being of sufficient depth and breadth to permit rotation of each of said bar members about its axis from one position to another when said spacer bar member has been passed through said plate openings and said slots are aligned with said plates wherein said plates engage in said slots to be maintained in spaced relation, the slots of one set on one side of the longitudinal axis of each bar member extending in a diagonal direction opposite the diagonal direction in which the corresponding slots of the set on the opposite side of such longitudinal axis extend with corresponding points along corresponding slots in opposite sets resting in common planes normal to the longitudinal axis of the spacer bar to effect a firm plate-in-slot engagement.

References Cited in the file of this patent

UNITED STATES PATENTS

| | | |
|---|---|---|
| 1,563,709 | Jacobson | Dec. 1, 1925 |
| 2,642,953 | Landgraf | June 23, 1953 |

FOREIGN PATENTS

| | | |
|---|---|---|
| 749,290 | France | May 2, 1932 |
| 773,867 | France | Sept. 10, 1934 |
| 385,508 | Great Britain | Dec. 29, 1932 |
| 893,555 | Germany | Oct. 15, 1953 |